(12) United States Patent
Larcher

(10) Patent No.: US 8,413,520 B2
(45) Date of Patent: Apr. 9, 2013

(54) METHOD AND DEVICE FOR STEADYING AN AIRCRAFT

(75) Inventor: David Larcher, Fontenilles (FR)

(73) Assignee: Airbus, Blagnac (FR)

( * ) Notice: Subject to any disclaimer, the term of this patent is extended or adjusted under 35 U.S.C. 154(b) by 0 days.

(21) Appl. No.: 13/060,854

(22) PCT Filed: Aug. 7, 2009

(86) PCT No.: PCT/FR2009/000989
§ 371 (c)(1),
(2), (4) Date: Feb. 25, 2011

(87) PCT Pub. No.: WO2010/023371
PCT Pub. Date: Mar. 4, 2010

(65) Prior Publication Data
US 2011/0154909 A1      Jun. 30, 2011

(30) Foreign Application Priority Data

Aug. 25, 2008  (FR) ...................................... 08 04686

(51) Int. Cl.
*G01M 5/00*       (2006.01)
(52) U.S. Cl.
USPC ........................................................... 73/802
(58) Field of Classification Search .................. 73/802
See application file for complete search history.

(56) References Cited

U.S. PATENT DOCUMENTS

| | | | | |
|---|---|---|---|---|
| 2,383,491 A | * | 8/1945 | Kemmer et al. | 73/798 |
| 4,385,527 A | * | 5/1983 | Raskin | 73/862.044 |
| 6,257,522 B1 | | 7/2001 | Friend et al. | |
| 7,775,093 B2 | * | 8/2010 | Cooper | 73/129 |
| 8,066,252 B2 | * | 11/2011 | Murata et al. | 248/671 |
| 2007/0175016 A1 | | 8/2007 | Sievers et al. | |

OTHER PUBLICATIONS

International Search Report Issued Jan. 14, 2010 in PCT/FR09/000989 filed Aug. 7, 2009.

* cited by examiner

*Primary Examiner* — Lisa Caputo
*Assistant Examiner* — Octavia Davis-Hollington
(74) *Attorney, Agent, or Firm* — Oblon, Spivak, McClelland, Maier & Neustadt, L.L.P.

(57) ABSTRACT

A method for steadying an aircraft using jack props, in which: a number and location of the props to be used is determined as a function of an area of operation, on the basis of a prop map; strain gauges arranged on the structure of the aircraft are used; predetermined props that are to be used are fitted; the strains measured by at least one strain gauge situated in the operating zone are checked; and the load applied by at least one prop positioned in the operating zone is regulated according to the strains measured by the gauge and so as to minimize the strains. A steadying device can implement the method.

12 Claims, 3 Drawing Sheets

METHOD AND DEVICE FOR STEADYING AN AIRCRAFT

BACKGROUND OF THE INVENTION

The present invention relates to a method and a device for steadying an aircraft with a view to a maintenance operation.

When an aircraft must undergo a maintenance operation directed in particular at its structure, for the purposes of verification and/or servicing and/or repair, it is often necessary to steady it by means of jack props in order to eliminate or at least limit the stresses occurring in the aircraft zone, referred to as working zone, affected by the maintenance operation.

It is important that the stress level caused in the working zone be as low as possible. In fact, during removal of a fastener in the working zone, a stress level that is too high makes it necessary to force the fastener, and in such a case the risk is high that the hole receiving the fastener will be warped. When such an incident occurs, it is then necessary to enlarge the hole diameter and to change the fastener diameter. But this cannot be repeated indefinitely, and the capacity of the aircraft to be repaired diminishes with each maintenance operation. In addition, inappropriate steadying also causes risks of deformation of the aircraft structure (in the working zone) in the case of removal of a large number of fasteners.

It should be noted that steadying must also be achieved while keeping the level of stresses occurring outside the working zone under control.

To permit such steadying, the aircraft structure usually comprises a plurality of anchoring points on which the props are anchored. The total number of props that can be used and their respective positioning are therefore defined in phases of design and manufacture of the aircraft. Within the scope of a maintenance operation, depending on the zone in question, it nonetheless is not necessary to position all of the props. In addition, the load that each prop must apply to the aircraft varies according to the working zone, the type of operation and the configuration of the aircraft. This is why the technicians generally establish, during the design of the aircraft, a list of usual operations, referred to as reference operations, which not uncommonly have to be performed during the life of the aircraft, as well as the corresponding working zones; they then establish a map of props to be used (or in other words, support points to be provided) and of loads to be applied per prop for each of these reference operations and/or for each of these working zones.

Within the scope of a maintenance operation corresponding to a reference operation, the application of the corresponding map of support points guarantees that the stresses that may be sustained by the aircraft structure in the working zone are normally lower than a given level at which the integrity of the aircraft structure can be preserved. However, the actually obtained stress level is rarely zero and often not low enough to permit removal of the fasteners without forcing them and to avoid the corresponding risks.

Furthermore, when an uncommon and unforeseen maintenance operation, or in other words one not corresponding to a reference operation (which is often the case during structural repairs), must be undertaken, the aforementioned maps cannot be used. It is then necessary to defined, by calculation, the props to be used and the corresponding loads to be applied. These calculations are performed on a simplified model of the aircraft wherein, for example, the fuselage and the wings of the aircraft are modeled by three beams (one beam for each aforesaid element). Consequently they yield very imprecise results, which do not make it possible to guarantee the desired stress level in the working zone. Furthermore, despite the allowed simplifications, these calculations are lengthy and must be performed by the aircraft manufacturer, thus creating additional delays that may last as long as one day. The costs of executing the calculations are increased by those resulting from downtime of the aircraft.

In addition, it may occur, during a maintenance operation, that previously undetected damage is discovered or else that a modification of the aircraft configuration is to be made (removal of an element that changes the weight of the aircraft, etc.). This then makes it necessary to recalculate the props, prolonging the duration of downtime of the aircraft even more. In addition, given that the calculations are based on a ratio that may contain errors and not on the real configuration of the aircraft, it cannot be ruled out that the initially planned props will have the effect of increasing the stresses in the damaged zone to the point that they may jeopardize the aircraft structure.

SUMMARY OF THE INVENTION

The invention is intended to alleviate these disadvantages by proposing a method and device for steadying an aircraft making it possible to obtain, with certainty, a very low stress level in the working zone, and even a zero stress level, both for a reference operation and for an uncommon and unforeseen maintenance operation.

The invention is also intended to improve the operational profitability of an aircraft by considerably reducing the durations of downtime of the aircraft and the costs related to its maintenance.

To achieve this, the invention relates to a method for steadying an aircraft in the context of a maintenance operation (which may or may not correspond to a reference operation) concerning an aircraft zone, referred to as working zone, the said method using jack props.

The method according to the invention is characterized in that:
- the number and positioning of the props to be used are determined according to the working zone, on the basis of a map of props,
- strain gauges arranged on the aircraft structure are used,
- the previously determined props to be used are set in place,
- the stresses measured by at least one strain gauge, referred to as primary monitoring gauge, situated in the working zone, are monitored,
- the load applied by at least one prop positioned in the working zone is regulated according to the stresses measured by the primary monitoring gauge and in such a way as to minimize these stresses.

In this way, according to the invention, the load applied by at least one prop positioned in the working zone is regulated on the basis of stresses actually being sustained by the aircraft structure at one point at least of the working zone, instead of being determined solely by means of a map or by a calculation with gross simplification hypotheses, and therefore being approximate. For this purpose, the invention provides that strain gauges are arranged on the aircraft structure. These gauges are housed, for example, in or on the skin of the aircraft and distributed regularly over the entirety of its structure.

In this way, by virtue of the invention, the stress level obtained in the working zone can be significantly lower than that obtained by means of a prior method, whether or not a reference operation is involved. The risks associated with removal of fasteners in this zone are reduced. Beyond this, in the case of an uncommon operation, the invention makes it possible to dispense with any related calculation prior to steadying and in this way to reduce the duration of downtime of the aircraft and the maintenance costs. In addition, the discovery of unforeseen damage in the working zone or a modification of the configuration of the aircraft does not interrupt the steadying method and does not necessitate any supplementary related calculation; the monitoring of the stresses measured by the primary monitoring gauge makes it possible to steady the aircraft taking this damage or this modification into account.

In a steadying method according to the present invention, the prop map used is selected, for example, from among a list of maps pre-established for each working zone for usual maintenance operations referred to as reference operations.

The strain gauges used are advantageously strain gauges of the aircraft that are arranged on the structure of the aircraft and calibrated at the time of its manufacture. This calibration does not pose any problem here, since the manufacture of the structure is achieved by means of stands capable of guaranteeing a zero stress level in the structure undergoing construction.

Advantageously, when a plurality of props is positioned in the working zone, the load applied by each prop positioned in the working zone is regulated according to stresses measured by the primary monitoring gauge and in such a manner as to minimize these stresses.

Preferably this regulation is effected in such a way that the stresses measured by the primary monitoring gauge become lower than a predetermined threshold value. If possible, the regulation is effected in such a way that these stresses become zero.

Advantageously, each (jack) prop comprises electronic control means making it possible to control the force in their jack, and the regulation defined in the foregoing is effected automatically by way of computerized means, referred to as centralized monitoring means, which subject the control means of each regulated prop to the measurements delivered by the primary monitoring gauge.

Preferably each prop situated outside the working zone is controlled (manually or preferably automatically) in such a way that it applies a constant load given by the selected map. This preferred embodiment does not rule out the possibility of also regulating the load applied by one or more of these props according to the stresses measured by the primary monitoring gauge.

Advantageously, the stresses measured by one or more other strain gauges, referred to as secondary monitoring gauges, are also monitored.

Certain of these secondary monitoring gauges may be situated in the working zone. In this case, the aircraft strain gauge closest to the position precisely concerned by the maintenance operation is chosen as primary monitoring gauge.

It is also possible to use, as secondary monitoring gauges, strain gauges situated outside the working zone, in order in particular to verify that the corresponding aircraft zones (in which these secondary monitoring gauges are situated) are not being subjected to stresses capable of causing local damage to the aircraft structure. The invention then makes it possible to keep the stress levels under control not only in the working zone but also in the rest of the aircraft structure, and preferably to do so throughout the entire maintenance operation, regardless of how it progresses. In the case of a system failure, the monitoring gauges will advantageously shut down the system automatically if they exceed authorized values.

Furthermore, the regulation of the props may be achieved on the basis of stresses measured by the primary monitoring gauge alone. As a variant, this is effected according to stresses measured not only by the primary monitoring gauge but also by one or more of the secondary monitoring gauges, preferably situated in the working zone. In this case, according to a first variant, the regulation is effected in such a way as to minimize the stresses measured by the primary monitoring gauge alone. According to a second variant, it is effected in such a way as to minimize both the stresses measured by the primary monitoring gauge and the stresses measured by one or more of the said secondary monitoring gauges.

The invention also relates to a steadying device comprising jack props, characterized in that it is adapted to permit employment of the method according to the invention.

In particular, when the regulation of the props is effected automatically, the steadying device according to the invention is characterized in that each (jack) prop comprises electronic control means making it possible to control the force of their jack, and in that the steadying device comprises computerized means referred to as centralized monitoring means, means for linking between the said centralized monitoring means and at least one strain gauge arranged in the aircraft, and means for linking between the said centralized control means and the means for controlling at least one prop, the centralized monitoring means being adapted to permit regulation of the load applied by the said prop according to the stresses measured by the said strain gauge, in such a way as to minimize these stresses. If necessary, the centralized monitoring means are adapted to permit regulation of the load applied by the prop according to the stresses measured by a plurality of strain gauges to which they are connected, and in such a way as to minimize the stresses measured by one or more of these gauges. The centralized monitoring means may also be connected to a plurality of props and may be adapted to permit regulation of the load applied by each of them, and to do so either according to the stresses measured by a single strain gauge and in such a way as to minimize the stresses measured by it, or according to the stresses measured by a plurality of strain gauges and in such a way as to minimize the stresses measured by one or more of these gauges.

BRIEF DESCRIPTION OF THE DRAWINGS

Other details and advantages of the present invention will become apparent upon reading the description hereinafter, which refers to the attached drawings and relates to a preferred embodiment, provided by way of non-limitative example. In these drawings.

DETAILED DESCRIPTION OF THE INVENTION

Figure 1:
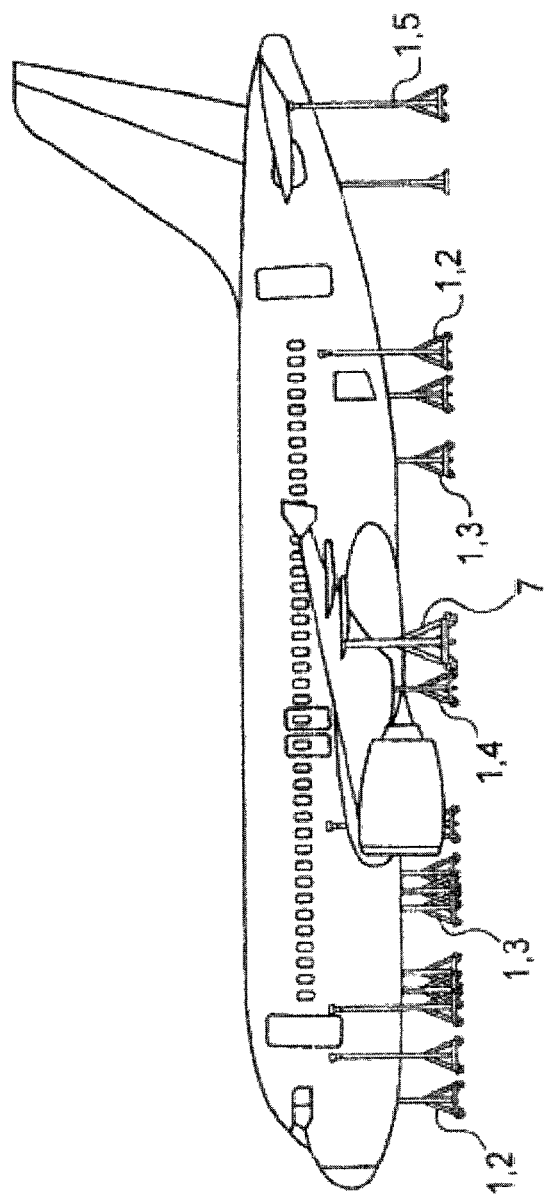
FIG. 1 is a profile view of a steadied aircraft.

In the context of a maintenance operation relating to its structure, an aircraft such as illustrated in FIG. 1 is usually steadied by means of props 1. To this end, anchoring points for anchoring props are provided in the aircraft structure.

The set of props 1 that can be used comprises: props 2 supporting the aircraft fuselage and arranged on the sides thereof; props 3 also supporting the aircraft fuselage and arranged in a median longitudinal plane thereof, including two main props 6 arranged respectively under the nose and under the tail of the fuselage; props 4 supporting the aircraft wings, including one main prop 7 for each of the two wings; props 5 supporting the tailplane of the aircraft. The set of props that can be used may be seen in FIG. 2: in this figure, each prop is denoted by a dot (with the exception of main props 6 and 7 denoted by triangles). Certain of these props, including the aforementioned main props 6 and 7, are systematically installed regardless of the maintenance operation to be carried out. The others are or are not installed depending on the operation and the aircraft zone in question. In fact, for each aircraft model, it is known to divide the aircraft into zones, referred to as working zones, each corresponding to one or more usual maintenance operations (verification, servicing, repair, etc.), referred to as reference operations, to distribute the anchoring points of the props according to the working zones surveyed in this way, and to establish, for each of these working zones, a map determining the props to be used. The working zones and the corresponding maps are established during the phase of design of the aircraft. The known maps furnish not only the props (number and positioning) to be used but also the procedure to be applied to the aircraft for each of them in the case of a reference operation. The working zone in question here (example: frame No. 20-22 or rib No. 22-25 upper arch, etc.) is entered by the operator into computerized means 11 (defined hereinafter) of the device according to the invention. These computerized means then furnish the corresponding pre-established map.

In known manner, each prop 1 comprises: an underframe; a jack generally arranged in substantially vertical position; control means comprising in particular means for actuating the jack and a load cell with which the load applied by the jack on the aircraft can be measured; means for anchoring the jack on the aircraft. The jack may equally well be hydraulic, with a pump and a manometer for measuring the applied force, or an endless screw, its actuating means in the latter case comprising on one hand a toothed wheel that engages with the said screw and on the other hand a motor driving the said wheel in rotation in one direction or the other (the shaft of the wheel remaining fixed). The means for anchoring the prop comprise, for example: an iron fitting, an upper part of which is inserted in a corresponding hole provided in a structure element of the aircraft (this hole forming an anchoring point such as defined in the foregoing), and a lower projecting part of which forms a ball joint; a first adapter element that at one end encompasses the said ball joint and at the other is coupled to the load cell (in the upper part thereof); a second adapter element that at one end is coupled to the load cell (in the lower part thereof) and at the other is coupled to a head of the jack.

The structure of a wing of an aircraft such as that illustrated generally comprises: spars, attached to the fuselage at the root and generally extending in a transverse direction corresponding to the direction of the wing span; ribs generally extending in a longitudinal direction of the aircraft, which ribs support an upper covering referred to as upper arch skin, and a lower covering, referred to as lower arch skin, and consequently transmit the aerodynamic loads to the spars; the aforementioned lower arch and upper arch skins. The ribs are usually numbered from the root outward.

Figure 2:
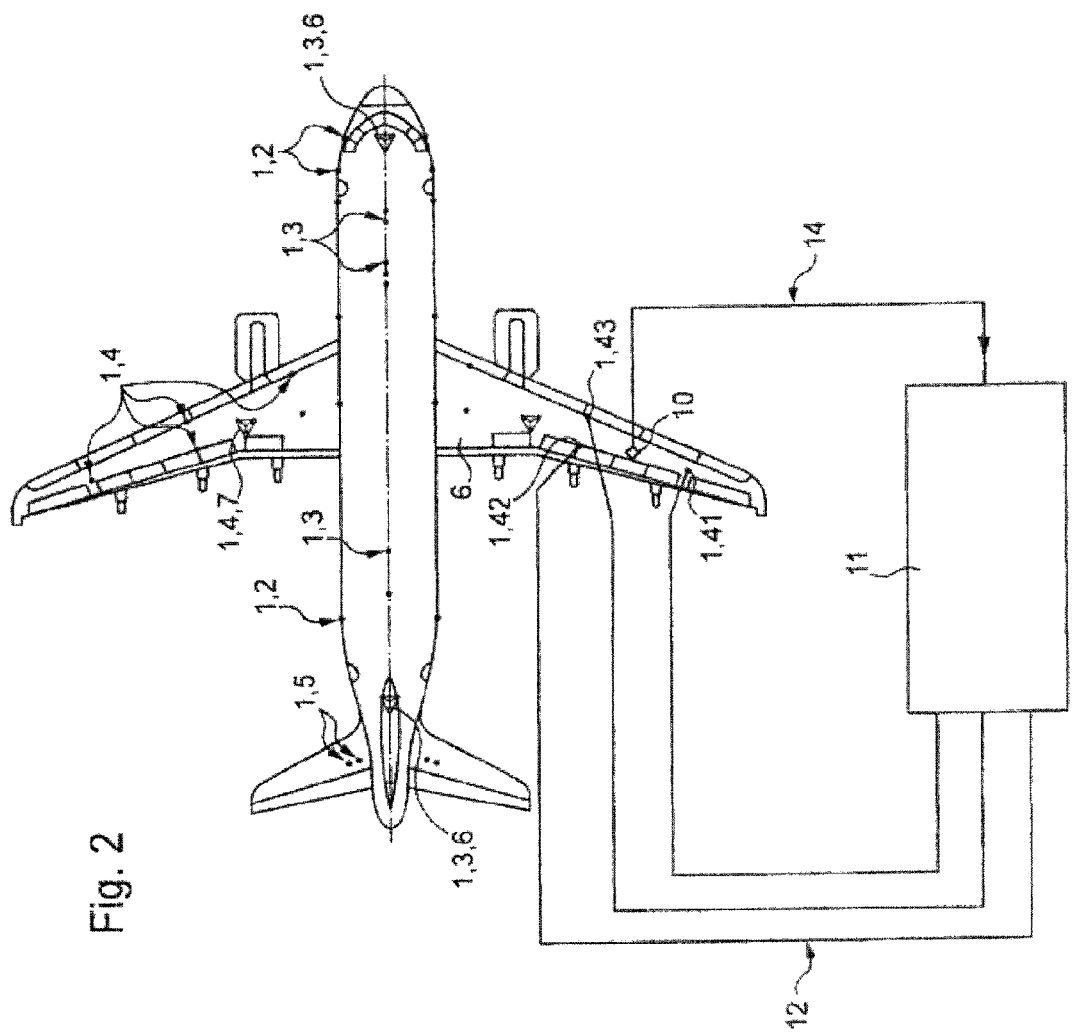
FIG. 2 is a schematic overhead view of the aircraft of FIG. 1, steadied by means of a steadying device according to the invention.

FIG. 2 illustrates more particularly a steadying method and device according to the invention. In the example, the steadying method is being employed in the context of a maintenance operation performed on the right wing of the aircraft, between rib No. 13 and rib No. 23 thereof. The device according to the invention comprises:

props 1 described in the foregoing,
computerized means 11, referred to as centralized monitoring means,
strain gauges arranged on the structure of the aircraft during manufacture thereof; the aircraft is advantageously equipped with at least one strain gauge per surveyed working zone,
linking means 12 (hard-wired or wireless) for linking centralized monitoring means 11 with a plurality of props 1;
linking means 14 (hard-wired or wireless) for linking centralized monitoring means 11 with one or possibly more strain gauges.

According to the invention, the map corresponding to the working zone is selected and props 1 to be used (number and positioning) are determined from this map. This map furnishes the props to be used inside and outside the working zone.

Regardless of its positioning, each prop to be used is preferably installed first of all in conformity with the data furnished by the selected map, especially as regards the load of the said prop. To accomplish this, the corresponding load furnished by the map is entered for each prop in the control means of the prop by way of an index load, and the jack thereof is actuated by its actuating means until the effectively applied load, such as measured by the load cell of the prop, is equal to the said index load.

In the illustrated example, it is considered that this index load is precisely the load to be applied throughout the entire maintenance operation for each prop positioned outside the working zone.

Figure 3:
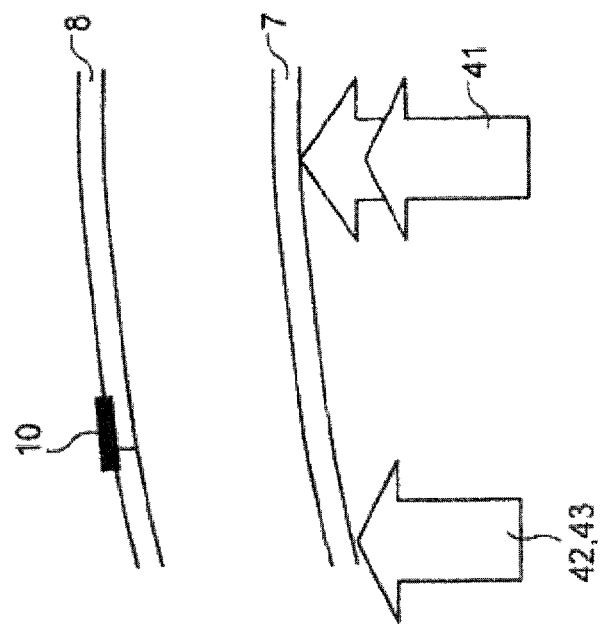
FIG. 3 is a schematic view in cross section of a wing portion of the aircraft of FIG. 2.
Figure 3:
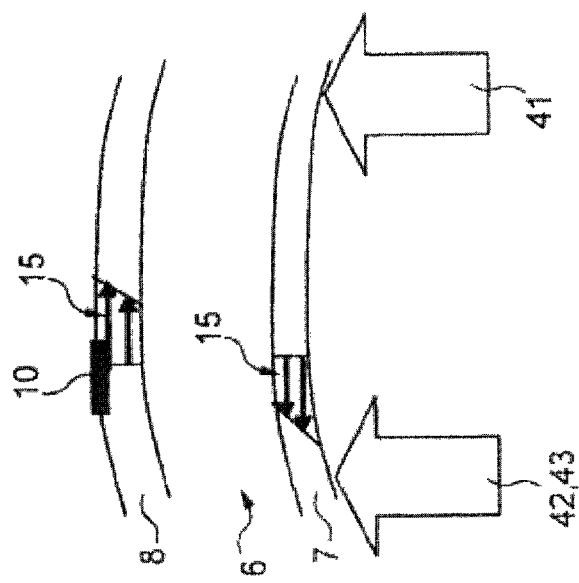

On the other hand, for each prop positioned in the working zone, the load to be applied is defined as being that which makes it possible to minimize or even reduce to zero the stresses measured by a strain gauge situated in the working zone. In the illustrated example, three props 41, 42, 43 supporting right wing 6 are installed in the working zone, at the limit thereof. The props denoted 42 and 43 are anchored to the structure of wing 6 at rib No. 13, while prop 41 is anchored to the structure of wing 6 at rib No. 22 As explained in the foregoing, each of these three props 41-43 is installed first of all, for example, in such a way as to apply a load corresponding to the load furnished by the selected map. This applied load is then regulated by way of centralized monitoring means 11 and of a strain gauge 10 situated in the working zone. In the illustrated example (see FIG. 3), this strain gauge 10 is placed on upper arch 8 of the wing, between ribs No. 13 and No. 22. Arrows 15 drawn in FIG. 3 symbolize the distribution of stresses sustained in real time by upper arches 8 and lower arches 7 of the wing in the transversal direction, substantially vertically below strain gauge 10. The left diagram of FIG. 2 corresponds to the distribution before regulation, and the right diagram corresponds to the distribution after regulation. In the example, before regulation, upper arch 8 is subjected to tensile stresses in the direction of the wing tip, the lower arch being subjected to opposite stresses. Finally, the arrow marked 42, 43 denotes the corresponding props and symbolizes the load applied by these two props 42, 43 on lower arch 7 at rib No. 13; arrow 41 denotes the corresponding prop and symbolizes the load applied by this prop 41 on lower arch 7 at rib No. 22.

Advantageously, centralized monitoring means 11 receive, in real time, via linking means 14, signals representative of the stresses measured by strain gauge 10. According to the distribution of these stresses (arrows 15), they transmit, in real time, to one or more of props 41-43, via linking means 12, control signals representative of a direction of displacement of the jack of the said prop—or in other words of a direction of rotation of the toothed wheel engaging with the said jack—which tends to re-equilibrate this distribution. The control means of props 41-43 control, in real time, the displacement of their respective jack according to the control signals that they receive from centralized monitoring means 11. In the illustrated example, centralized monitoring means 11 are not sending any control signal to props 42 and 43, whose jacks consequently remain immobile. On the other hand, they are sending, to the control means of prop 41, control signals that make it possible to displace its jack upward. When the stresses measured by strain gauge 10 become zero or change direction, centralized monitoring means 11 cease sending these control signals to prop 41, and so the displacement of the jack thereof is stopped instantaneously. If the measured stresses change direction without being reduced to zero, the regulation may be continued if necessary by control of props 42, 43, as explained for prop 41.

This regulation makes it possible to achieve, in the working zone, an extremely low and even zero stress level, and to do so without preliminary calculation and in rapid, certain and economical manner. The stress level attained facilitates the maintenance operations and considerably reduces the attendant risks reviewed in the introduction (increase of the size of fasteners during each maintenance operation and subsequent reduction of the capacity of the aircraft to be repaired, deformation of the aircraft structure, etc.).

The invention may be the object of numerous variants compared with the illustrated embodiment, provided these variants fall within the scope defined by the claims.

For example, it is possible to monitor the measured stresses by a plurality of strain gauges, one of which is a strain gauge referred to as primary monitoring gauge, corresponding to the gauge of the aircraft situated closest to the location involved in the maintenance operation, and strain gauges referred to as secondary monitoring gauges. The regulation of the loads applied by the prop or props positioned in the working zone may or may not depend on the stresses measured by the secondary monitoring gauges.

The invention claimed is:

1. A method for steadying an aircraft in context of a maintenance operation concerning an aircraft working zone, the method using jack props and comprising:
   determining a number and positioning of the props to be used according to the working zone, on the basis of a map of props;
   using strain gauges arranged on an aircraft structure of the aircraft;
   setting previously determined props to be used in place;
   monitoring stresses measured by at least one strain gauge, as a primary strain gauge, situated in the working zone; and
   regulating a load applied by at least one prop positioned in the working zone according to the stresses measured by the primary monitoring gauge and so as to minimize the stresses.

2. A steadying method according to claim 1, wherein the prop map is selected from among a list of maps pre-established for each working zone for usual maintenance operations, as reference operations.

3. A steadying method according to claim 1, wherein the strain gauges used are strain gauges of the aircraft, arranged and calibrated at a time of manufacture of the aircraft.

4. A steadying method according to claim 1, wherein the load applied by each prop positioned in the working zone is regulated according to stresses measured by the primary monitoring gauge and so as to minimize the stresses.

5. A steadying method according to claim 4, wherein each prop used comprises a jack and electronic control means making it possible to control force in their jack, wherein the regulation is applied automatically by a computerized centralized monitoring means, which subjects the control means of each regulated prop to the measurements delivered by the primary strain gauge.

6. A steadying method according to claim 1, wherein each prop situated outside the working zone is controlled so as to apply a constant load given by a selected map.

7. A steadying method according to claim 1, further comprising measuring stresses by one or more other strain gauges, as secondary monitoring gauges, situated inside or outside the working zone.

8. A steadying method according to claim 7, wherein the regulation is effected according to stresses measured both by the primary monitoring gauge and by one or more of the secondary monitoring gauges.

9. A steadying device comprising jack props, configured to implement the method according to claim 1.

10. A steadying device according to claim 9, wherein each prop comprises electronic control means making it possible to control force of their jack, and wherein the steadying device comprises computerized centralized monitoring means, means for linking between the centralized monitoring means and at least one strain gauge arranged in the aircraft, and means for linking between the centralized monitoring means and the means for controlling at least one prop, the centralized monitoring means configured to permit regulation of the load applied by the prop according to the stresses measured by the strain gauge, so as to minimize the stresses.

11. A steadying device according to claim 10, wherein the centralized monitoring means is configured to permit regulation of the load applied by the prop according to the stresses measured by a plurality of strain gauges to which the centralized monitoring means are connected so as to minimize the stresses measured by one or more of the gauges.

12. A steadying device according to claim 10, wherein the centralized monitoring means is configured to permit regulation of the loads applied by a plurality of props to which they are connected, according to the stresses measured by one or more strain gauges and so as to minimize the stresses measured by this gauge or by one or more of the gauges.

* * * * *